United States Patent
Ketcham et al.

(10) Patent No.: US 7,588,856 B2
(45) Date of Patent: Sep. 15, 2009

(54) RESISTIVE-VARYING ELECTRODE STRUCTURE

(75) Inventors: Thomas D. Ketcham, Big Flats, NY (US); Cameron W. Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/912,036

(22) Filed: Aug. 4, 2004

(65) Prior Publication Data

US 2006/0029860 A1    Feb. 9, 2006

(51) Int. Cl.
H01M 4/86     (2006.01)
H01M 4/66     (2006.01)
H01M 4/50     (2006.01)

(52) U.S. Cl. ................ 429/44; 429/32; 429/209
(58) Field of Classification Search ........ None
See application file for complete search history.

(56) References Cited

U.S. PATENT DOCUMENTS

| | | | |
|---|---|---|---|
| 5,190,834 A | 3/1993 | Kendall | 429/31 |
| 5,273,837 A | 12/1993 | Aitken et al. | 429/30 |
| 5,543,239 A | 8/1996 | Virkar et al. | 429/33 |
| 5,925,477 A * | 7/1999 | Ledjeff et al. | 429/32 |
| 6,013,386 A | 1/2000 | Lewin et al. | 429/30 |
| 6,045,935 A | 4/2000 | Ketcham et al. | 429/30 |
| 6,078,842 A | 6/2000 | Gross et al. | 607/152 |
| 6,127,061 A * | 10/2000 | Shun et al. | 429/40 |
| 6,168,878 B1 | 1/2001 | Fauteux et al. | 429/59 |
| 6,336,049 B1 | 1/2002 | Kimbra et al. | 607/148 |
| RE37,749 E | 6/2002 | Poris | 204/230.1 |
| 6,479,178 B2 | 11/2002 | Barnett | 429/32 |
| 6,551,735 B2 | 4/2003 | Badding et al. | 429/31 |
| 6,582,845 B2 | 6/2003 | Helfinstine et al. | 429/33 |
| 6,623,881 B2 | 9/2003 | Badding et al. | 429/30 |
| 6,632,554 B2 | 10/2003 | Doshi et al. | 429/30 |
| 7,344,793 B2 * | 3/2008 | Warrier et al. | 429/34 |
| 2002/0058175 A1 | 5/2002 | Ruhl | 429/32 |
| 2002/0081489 A1 | 6/2002 | Ng et al. | 429/161 |
| 2002/0102450 A1 | 8/2002 | Badding et al. | 429/32 |
| 2003/0096147 A1 | 5/2003 | Badding et al. | 429/30 |
| 2004/0028975 A1 | 2/2004 | Badding et al. | 429/32 |
| 2004/0072057 A1 * | 4/2004 | Beatty et al. | 429/38 |
| 2004/0121222 A1 | 6/2004 | Sarkar et al. | 429/45 |
| 2004/0161659 A1 * | 8/2004 | Lloyd et al. | 429/44 |

FOREIGN PATENT DOCUMENTS

| | | |
|---|---|---|
| EP | 1304755 A2 | 4/2003 |
| EP | 1304756 A2 | 4/2003 |
| WO | WO03/067683 A2 | 8/2003 |

OTHER PUBLICATIONS

Corning Incorporated pending U.S. Appl. No. 60/558,166, filed Mar. 31, 2004, M. Badding, et al "Fuel-Cell Device With Varied Active Area Sizes".
"Polarization Effects in Intermediate Temperature, Anode-Supported Solid Oxide Fuel Cells," Jai-Who Kim, et al Journal of The Electrochemical Society, 146 (1) 69-78 (1999).
"Reduced-Temperature Solid Oxide Fuel Cell Based on YSZ Thin-Film Electrolyte," Selmar de Souza, et al J. Electrochem. Soc., vol. 144, No. 3, Mar. 1997.
"A Mathmatical Model of a Solid Oxide Fuel Cell," Norman F. Bessette II, et al, J. Electrochem. Soc., vol. 142, No. 11, Nov. 1995.

* cited by examiner

*Primary Examiner*—John S Maples
(74) *Attorney, Agent, or Firm*—Michael W. Russell; Gregory V. Bean; Juliana Agon

(57) ABSTRACT

An electrode structure for a low voltage, high current electrical production device includes a charge transfer member (612). An electrically conductive member (605) having a non-uniform resistance is disposed on the charge transfer member 612 for optimizing current coupling.

14 Claims, 12 Drawing Sheets

Via Contact

RESISTIVE-VARYING ELECTRODE STRUCTURE

BACKGROUND OF THE INVENTION

1. Field of the Invention

The present invention relates to electrochemical devices such as batteries, fuel or photovoltaic cells and oxygen separators, catalysts, sensors, etc. and in particular to a current coupling (including collection or distribution) structure for such electrochemical devices.

2. Description of Related Art

A solid oxide fuel cell (SOFC) is an energy conversion or power generating device that produces direct-current electricity by electrochemically reacting a gaseous fuel (e.g., hydrogen) with an oxidant (e.g., oxygen) across a single cell of oxide electrolyte sandwiched between a cathode electrode layer and an anode electrode layer. The key features of current SOFC technology include all solid-state construction, multifuel capability, and high-temperature operation. Because of these features, the SOFC has the potential to be a high-performance, clean and efficient electric power source that is under development for stationary and mobile applications.

It is known that the principal losses in most solid state electrochemical devices occur in the electrodes and/or at electrode/electrolyte interfaces. It is also recognized that minimization of these losses, which arise from either concentration polarization or activation polarization or both, is crucial to the efficient operation of these devices. For example, minimization of these losses is central to obtaining high current and power densities in solid oxide fuel cells.

Under typical operating conditions, an SOFC single cell produces less than 1V. Thus, for practical applications, single cells are stacked in electrical series to build voltage. Stacking is provided by a component, referred to as an interconnect, that electrically connects the anode of one cell to the cathode of the next cell in a stack. Conventional SOFCs are operated at about 1000° C. and ambient pressure.

Costs of SOFC systems are still too high for the technology to be considered commercially competitive. Expense is primarily due to the poor performance of the SOFC stack. The focus of SOFC costs reductions programs are electrolyte fabrication, electrode microstructure, and interconnect design and materials. The first two challenges have been addressed, but interconnect design and materials still need to be improved.

Several processing techniques have been developed to produce thin, air-tight electrolytes of yttria stabilized zirconia with low resistance. Electrode microstructures that have low activation resistances are widely known and utilized.

One example of a SOFC single cell is a ceramic tri-layer consisting of an oxide yttria-doped or stabilized zirconia electrolyte (YSZ) sandwiched between nickel/YSZ for the anode and a strontium-doped lanthanum manganite (LSM) cathode connected to a doped lanthanum chromite interconnect. Typical and state-of-the-art single cells are based upon a porous composite cathode of $Sr_{0.2}La_{0.8}MnO_3$(LSM)/8 m/o yttria-stabilized zirconia (8 YSZ), a porous composite anode of nickel/8YSZ, and a YSZ electrolyte and deliver power densities in excess of 2 W/cm² at 800° C.

Improvements in interconnect materials and design are still needed. The interconnects of anode-support designs are based upon transition metals and develop oxide scales that impede current flow. It is only recently recognized that the design of the interconnect and single-cells in some designs does not efficiently collect current from the electrodes. The role and effect of current distribution in the electrode on system performance has not been addressed.

System performance is sometimes dominated entirely by current distribution losses in the electrodes. In fact, the resistive effects of the single cell can be negligible.

In contrast to anode-suported or cathode-supported electrolyte, Corning's solid oxide fuel cell (SOFC) design is based upon a thin, mechanically flexible electrolyte sheet as disclosed in U.S. Pat. No. 5,273,837. The electrolyte acts as the support for the electrodes and is punched with via holes for "through-the-electrolyte" interconnections as disclosed in U.S. Pat. No. 6,623,881. Unlike other SOFC designs where voltage is built by interconnection of separate electrolyte bearing elements such as cathode-supported tubes or anode-supported plates, the Corning design integrates the interconnect with the electrolyte to build voltage from multiple single cells arranged on a single electrolyte membrane.

Overall, the Corning design has the potential to deliver higher volumetric power density than other designs. Besides low cost of materials, the flexible electrolyte design with through-the-electrolyte interconnects can simultaneously solve the interconnect material problem and distribute current to (collect current from) electrodes.

Although cost is the ultimate determinant of commercial viability, performance is linked to cost within any design. Area specific resistance (ASR) is a commonly cited figure. of merit for fuel cells. The absolute slope of the plot of cell voltage vs. current density is defined as the area specific resistance of the cell (ohm-cm²).

Many factors contribute to ASR such as materials properties, processing conditions, and design geometry. Though not accounting for the effect of processing, the properties of most materials used to construct an SOFC are known. Performance and cost of a design can be predicted and optimized.

Activation polarization and resistance to oxygen ion transport are the primary contributors to internal resistance of the single cell. Theoretical fabrication and essential features of low internal resistance cells are known. It must be mentioned that concentration polarization can impact performance in certain situations, however, such effects are typically negligible except at current densities in excess of 5 A/cm² or under fuel or oxidizer starvation conditions. At the next level of design, current is collected from the cathode into an interconnect pad, through the via to another interconnect pad, and is finally distributed throughout the anode of the strip cell of the Corning type.

Single cells should be designed to facilitate current distribution and collection in the electrodes. However, high power density of a well-designed single-cell can still be lost during current distribution. Distribution/collection losses become excessive when electrodes are too wide, too thin, or lacking in conductivity. This is especially true for LSM in the cathode. Conductivity of LSM is only 100 S/cm in comparison to 24,000 S/cm for nickel in the anode. Optimum theoretical electrode width for a 20 µm thick LSM cathode is less than approximately 1 mm to minimize power losses. In current practice, it is difficult to manufacture strip cell electrodes of that width. At present, a high conductivity (>10,000 S/cm) layer of a porous silver-palladium alloy that is about 10 µm in thickness is deposited on top of the cathode to facilitate current distribution. Such a fuel cell is described in U.S. Pat. No. 6,623,881 where the electrical conductors are relatively flat and made from silver-palladium alloys (e.g., 70% silver-30% palladium). Although the use of the flat silver-palladium electrical conductors disclosed in this patent application works well in most applications they can in some applications limit the durability of the fuel cell and may not meet cost requirements. Silver is volatile and mobile at normal operation temperatures of a SOFC.

One solution would be to replace silver with a more refractory noble metal current collector like gold. Material cost of the current collector per kilowatt can be estimated and related to cell ASR by the following equation 4000×ASR×p×d×t where p is cost of the current collector material in dollars per gram, d is the density, and t is the thickness required to achieve the designated ASR. The conductivity of gold is similar to silver, thus a 10 μm thick gold layer would also be desired. A performance target of ~0.5 W/cm$^2$ at maximum power corresponds to an ASR of 0.5 Ωcm$^2$. This alone gives an estimated material cost of ~200 dollars per kilowatt for the current collector that is excessive.

Therefore, a manufacturable interconnect design that does not rely upon silver and/or minimizes the use of precious metal in the cathode current collector is desirable. Solutions that eliminate silver also broaden the operation temperature range from 600-800 to 600-900° C. This is advantageous as thermal management constraints are eased somewhat and ASR can be lower at higher temperatures.

Therefore, there is a need for various SOFC design options that optimize performance (minimize ASR) under constraints of a given set of material properties, cost, and ability to manufacture while maximizing power output at the stack level. Such conditions to improve designs of single-cells in conjunction with the via and via/electrode contact include no silver, a fixed quantity of precious metal per single cell, a limited number of interconnects per single cell, manufacturable electrode width, use of oxide cathode current collectors, and shaped vias, etc.

In particular, SOFC designs that eliminate silver in general and specifically within the current collection structure used to distribute electrons through out the cathode has the following advantages:
 1) Enhances operational system lifetime;
 2) Enables operation at higher temperatures where specific power is higher; and
 3) Eases constraints of temperature management during operation.

Accordingly, there is a need for a fuel cell that utilizes electrically conductive current collectors which have a specific composition and/or a specific geometry that enhances the durability of the fuel cell, yet is cost-effective. This need and other needs are addressed by the fuel cell and electrical conductors of the present invention.

BRIEF DESCRIPTION OF THE INVENTION

An electrode structure for a low voltage, high current electrical production device includes a charge transfer member. An electrically conductive member having a non-uniform resistance is disposed on the charge transfer member for optimizing current coupling.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1-10, there are disclosed several different embodiments of electrically conductive members that can be used in low voltage, high current electrical production devices, such a fuel cells or other electrochemical converters in accordance with the present invention. Although the fuel cells described below are solid oxide fuel cells ("SOFCs"), it should be understood that other types of fuel cells besides SOFCs can be used in the present invention. Accordingly, the fuel cell and method for making the fuel cell in accordance with the present invention should not be construed in a limited manner. Furthermore, the exact pattern of the non-uniform or resistive-varying current collection structure need not be duplicated as they can vary for different applications.

Figure 6:
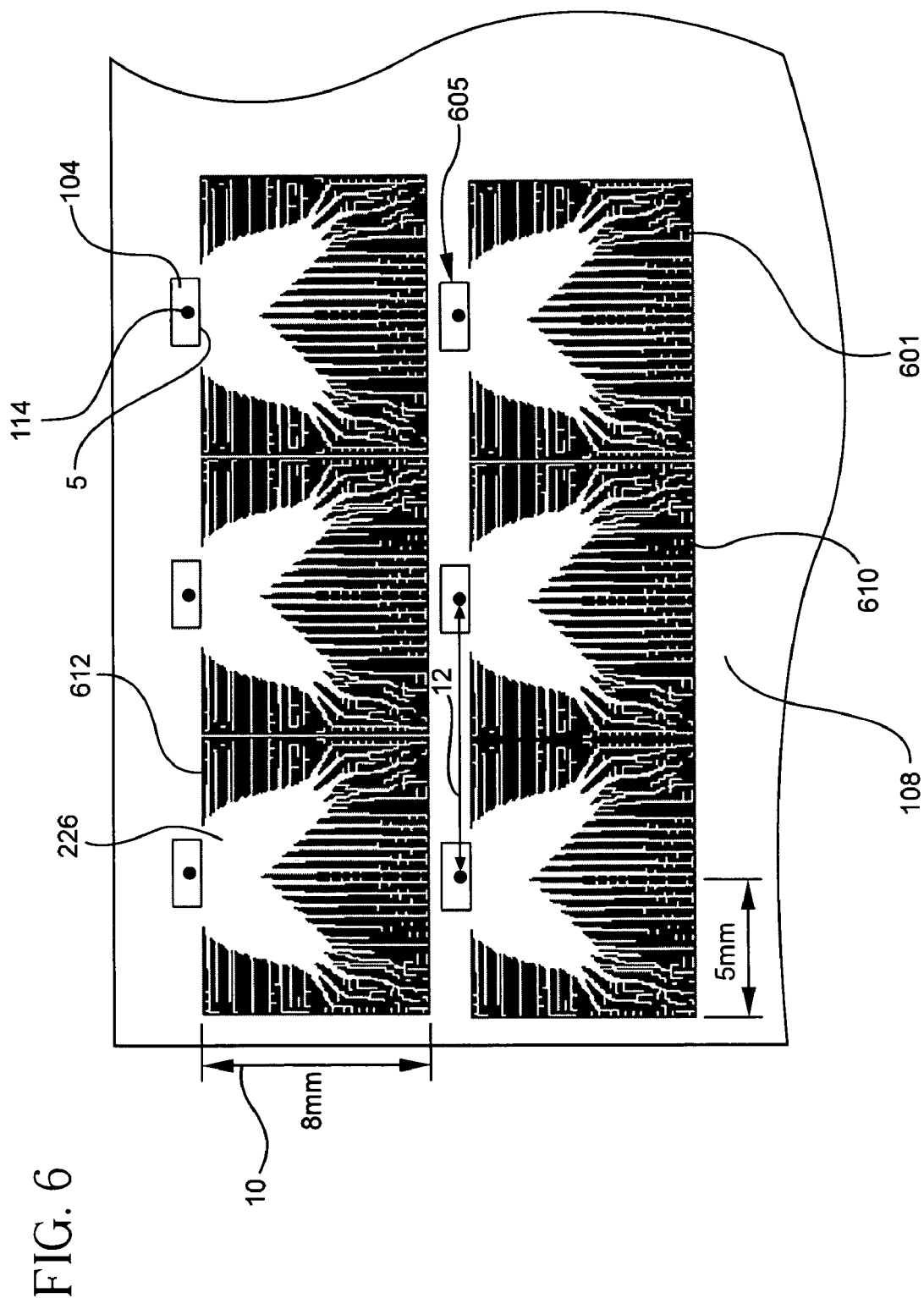
FIG. 6 is a top view of an electrode structure, in accordance with the teachings of the present invention.

Referring to FIG. 6, an electrode structure for a low voltage, high current electrical production device is shown. The electrode structure includes a charge transfer member 612. An electrically conductive member 605 having a non-uniform resistance is disposed on the charge transfer member 612 for optimizing current collection. The electrically conductive member 605 includes a current collector 226 disposed on the charge transfer member 612. A via contact 5 interconnects the current collector 226 and the charger transfer member 612. The via contact 5 includes a via pad or tab 104 having a via, hole, or aperture 114 filled with a via fill that together forms an electrical conductor 104. The charge transfer member 612 is an electrode that could be an anode or a cathode disposed on opposing sides of a flexible electrolyte 108, for use as a fuel cell. However, other uses are contemplated that could use the same resistance varying electrode structure of the present invention.

The charge transfer member 612 is typically an electrode layer that sits closest to the electrolyte sheet 108 for performing an actual charge transfer reaction such as reduction of oxygen at the cathode 612. The patterned layer disposed on top is a current collector/distributor. Although the electrode 612 needs to have some electronic conductivity to move current over short distances, that conductivity is usually inadequate to move current over the entire surface of the electrode 612 without compromising some other requirements such as flexibility in the case of the flexible electrolyte 108 for the Corning SOFC design. Thus, it is necessary to use a second material with higher conductivity to perform the current collection function. For the cathode 612, there are a limited number of materials which are stable in both air and that have high conductivity. For example, Au, Pd, Rh, Ir, platinum and silver have higher conductivity than LSM but are expensive. However, with the teachings of the present invention the cost of platinum/silver or gold (Au), palladium (Pd), rhodium (Rh), or iridium (Ir) is mitigated by using specially shaped structures and nickel (Ni) or copper (Cu) for the anode.

Figure 10:
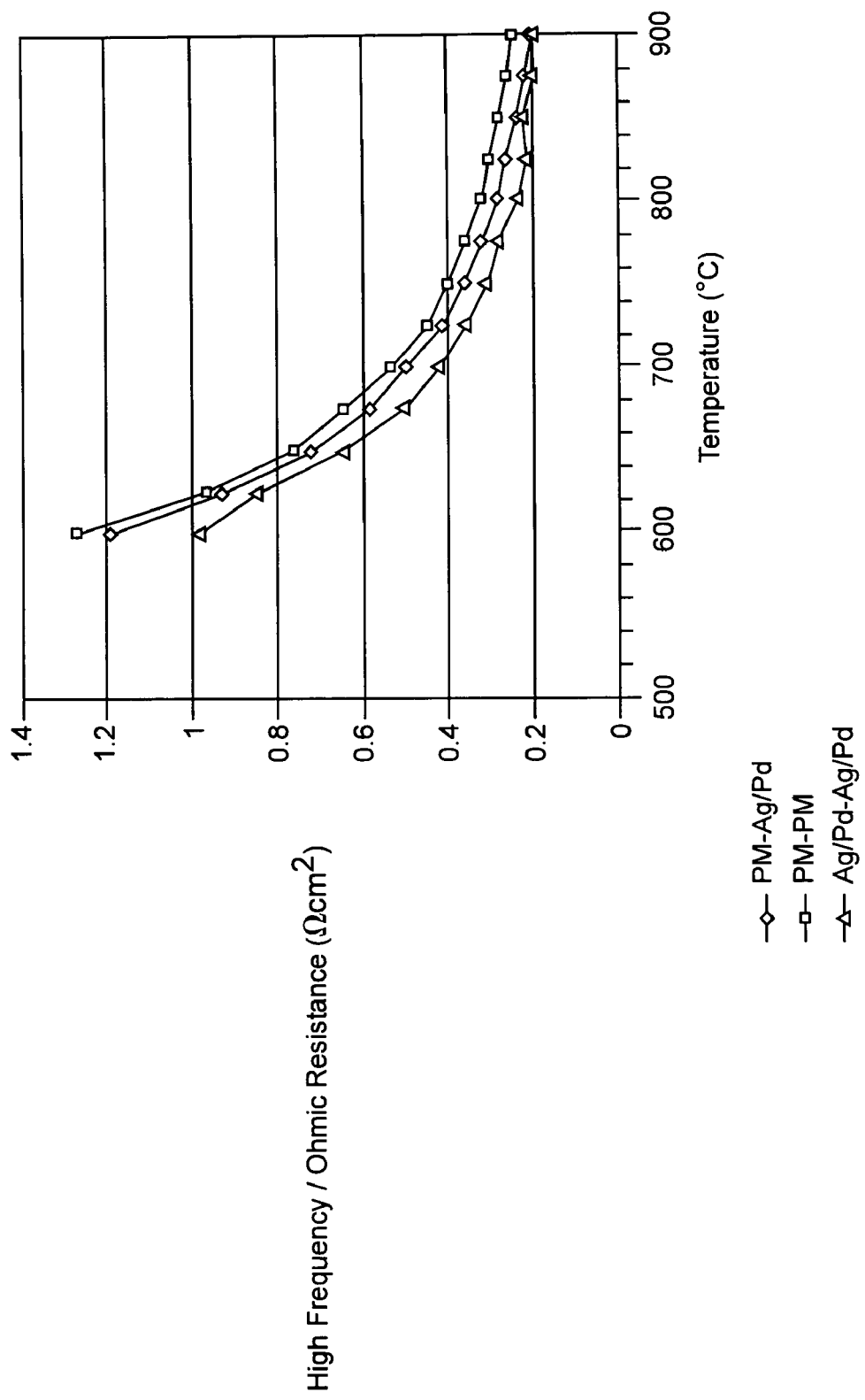
FIG. 10 shows a graph of resistance comparisons, in accordance with the teachings of the present invention.

The data plotted in FIG. 10 show that small quantities of platinum with greater thermal stability can replace silver palladium current collectors. In this example, the widely known technique of impedance spectroscopy was used to measure the high frequency or ohmic resistance of oxygen pump specimens as a function of temperature for three current collection/distribution situations. The ohmic resistance includes current collection and distribution losses and resistance to oxygen ion transport in the electrolyte. The lowest resistance was obtained when a thickness of ~8 µm/electrode of 90 Ag/10 Pd alloy was used for current coupling over the entire surface of both electrodes. Replacement of one of the 90 Ag/10 Pd current collectors with a platinum metal current collector of an optimized shape as taught in this invention with a thickness of ~1 µm results in a small, modest increase in resistance. Replacement of the remaining 90 Ag/10 Pd current collector with another thin platinum current collector with an optimized profile results in another modest increase in resistance. As seen in FIG. 10, a current collector made from thin, cost effective quantity of precious metal with a shape optimized for current coupling is almost as good as the reference sample that uses two thicker Ag/Pd current couplers. Most importantly, use of a Ag/Pd with the same shape and thickness would lead to similar ohmic resistance as for the case of the platinum, but the upper use temperature would be lower and lifetime shorter. Effects of electrode width 10, via 114 design parameters, via placement 12 and shaping, profiling of current collection structures 226, use of materials with differing transport properties, etc. are taught by the present invention.

Profiling of current collection structure thickness 226, whether by the existence of only one layer with cut-away portions exposing the charge transport member below 612 as seen in FIG. 6 or with multiple layers, or other resistance variations, has some specific advantages:
 1) If use of precious metal is necessary, quantity is minimized while performance in maximized.
 2) Reduces the number of via holes 114 per unit area of electrolyte 108 or per single-cell 610 of a grid array or pick-up points on a single cell.
 3) Enables the use of electrodes widths 10 that are easily manufactured with current techniques.

For example, in FIG. 7, a current collection structure 226 based upon a high conductivity (1000 S/cm) oxide such as lanthanum strontium cobaltite (LSC), possibly mixed with a small quantity of precious metal (Pt, Au, Pd), that has a tapered/profiled distribution on the electrodes 612 when combined with a square-cell design 601 and somewhat smaller electrode width 10 can offer equal or superior performance, at a reduced ASR, at a lower cost than a strip-cell design with a Ag/Pt/Pd alloy current collector.

Thus, the present invention teaches: 1) use of a current collection structure with a profiled thickness on either the cathode or anode, 2) use of current collection structure with a thickness profile that minimizes ASR, and 3) use of a current collection structure with a thickness profile that approximates a profile that minimizes ASR, 4) use of a profiled current collection structure in conjunction with either continuous or discrete via contacts.

Figure 1A:
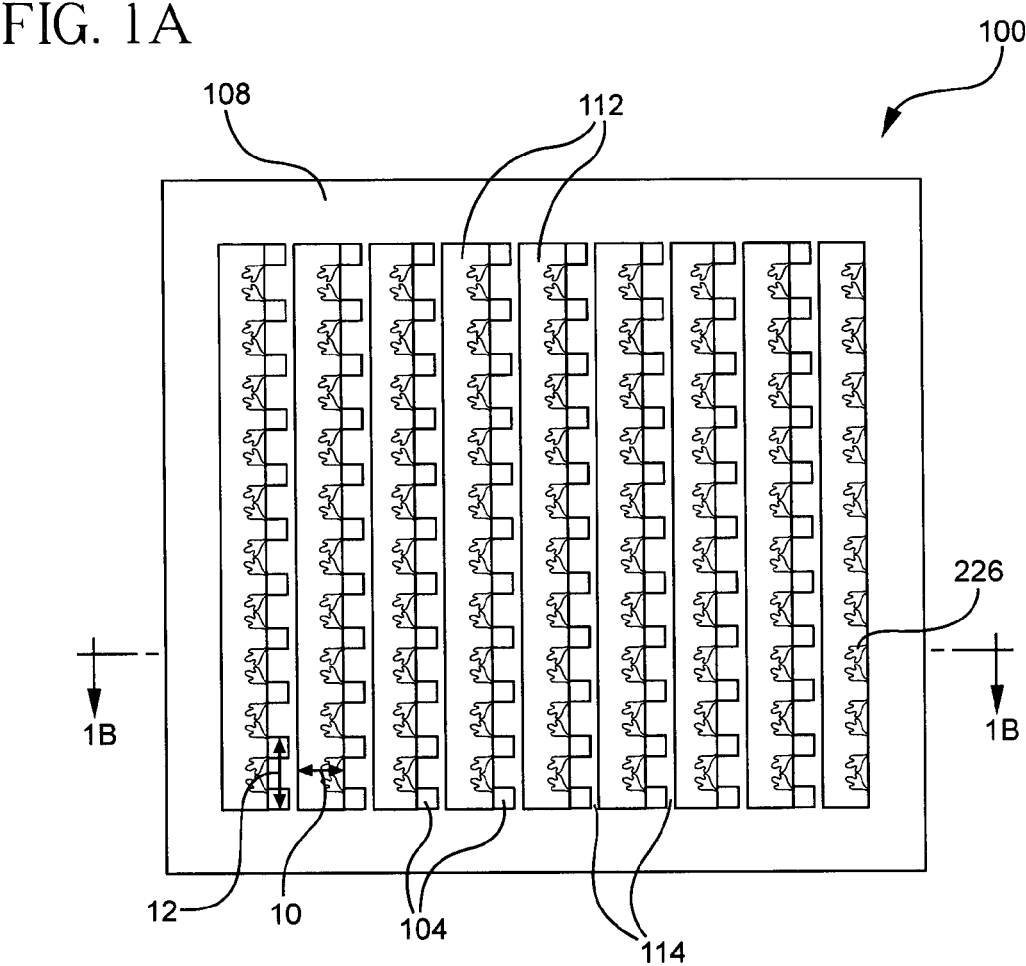
FIGS. 1A and 1B show a top view and a cross-sectional side view of a resistive-varying fuel cell that has a series of electrochemical cells which are connected to one another by resistive-varying electrically conductive members in accordance with teachings of the present invention.
Figure 1B:
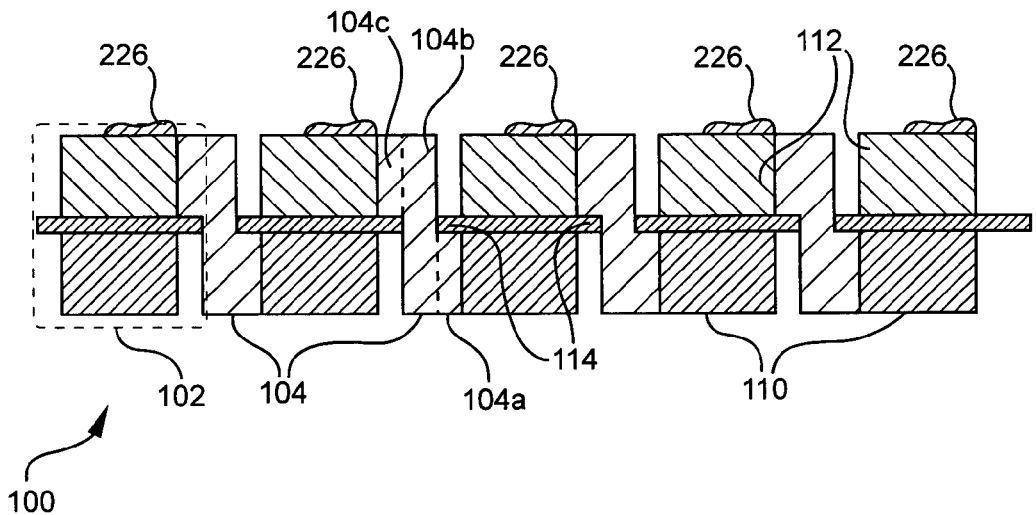

Referring to FIGS. 1A and 1B, there are shown a top view and a cross-sectional side view of a fuel cell 100 that has a series of electrochemical cells 102 which are connected to one another by electrical conductors 104 for a one dimensionally or columnar interconnected single cells arrangement. The resistive-varying electrically conductive member in the form of a thickness-varying current collector 226 is shown in the side-view of FIG. 1B and the top view of FIG. 1A showing the cathode side. Preferably, the varying-resistive current collector is disposed on the cathode. However, a similar structure can be disposed only or also on the anode. Basically, the fuel cell 100 is based on a thin, compliant electrode/electrolyte structure that offers improved cell design flexibility while retaining high strength, mechanical integrity, and resistance to thermal degradation from temperature cycling and thermal shock. The electrode/electrolyte structure includes a thin flexible solid oxide electrolyte sheet 108 that can be made from yttria-($Y_2O_3$) stabilized zirconia ($ZrO_2$) (for example). The electrode/electrolyte structure further includes an array of anode electrodes 110 (e.g., negative fuel electrodes 110) and cathode electrodes 112 (e.g., positive air electrodes 112) disposed on opposing sides of the electrolyte sheet 108. The anode electrodes 110 can be made from nickel-$ZrO_2$ cermet (for example). And, the cathode electrodes 112 can be made from strontium-doped lanthanum manganite $\{(La_{0.8}Sr_{0.2})MnO_3\}$(for example). The electrodes 110 and 112 do not form continuous layers on the electrolyte sheet 108, but instead define multiple discrete regions or electrochemical cells 102. The electrochemical cells 102 are electrically interconnected in series, parallel, or a combination thereof by one or more electrical conductors 104 (e.g., via fillers, cell interconnects) that extend through via holes 114 in the electrolyte sheet 108 and contact the electrodes 110 and 112. The electrical conductors 104 include three portions 104a, 104b, and 104c. Hence, current is collected from the cathode 112 into an interconnect pad portion 104c, through the via portion 104b to another interconnect pad portion 104a, and is finally distributed throughout the anode 110.

Figure 2A:
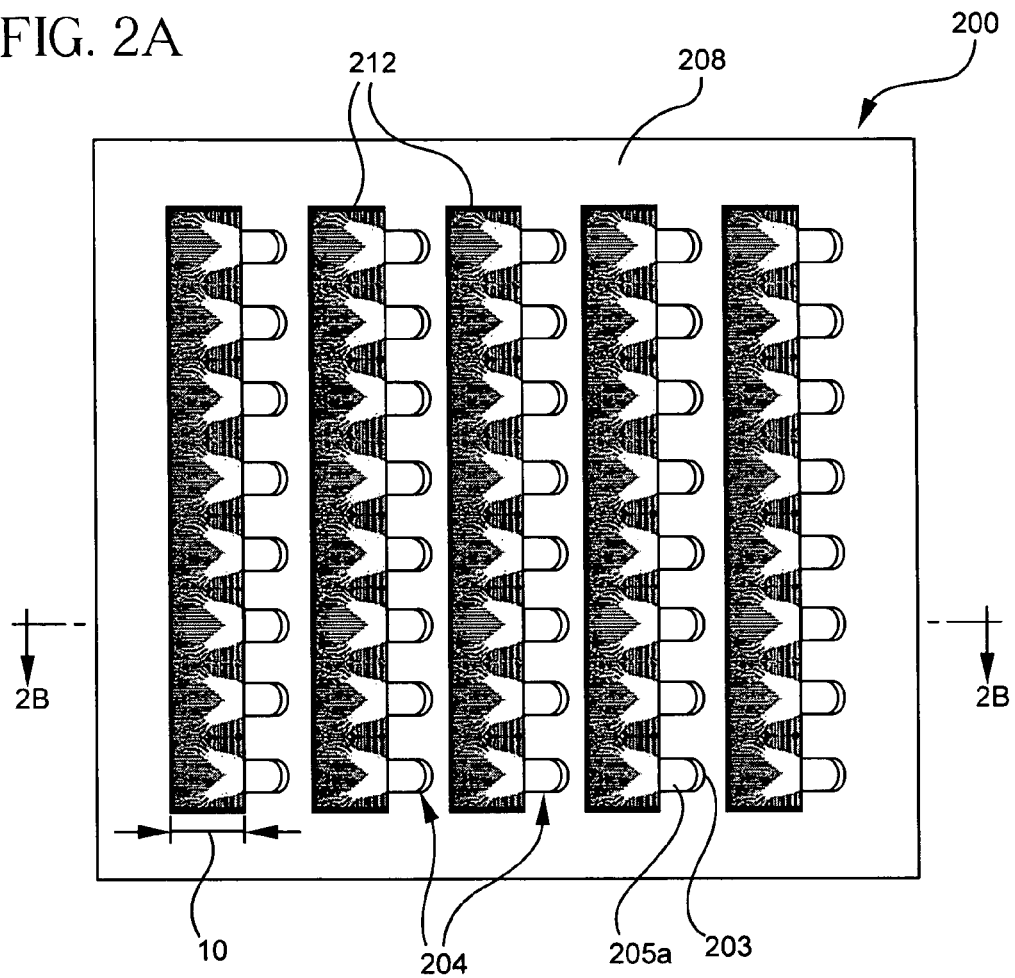
FIGS. 2A and 2B show a top view and a cross-sectional side view of a fuel cell that has a series of electrochemical cells which are connected to one another by resistive-varying electrically conductive members that have varying thickness in accordance with the teachings of the present invention.
Figure 2B:
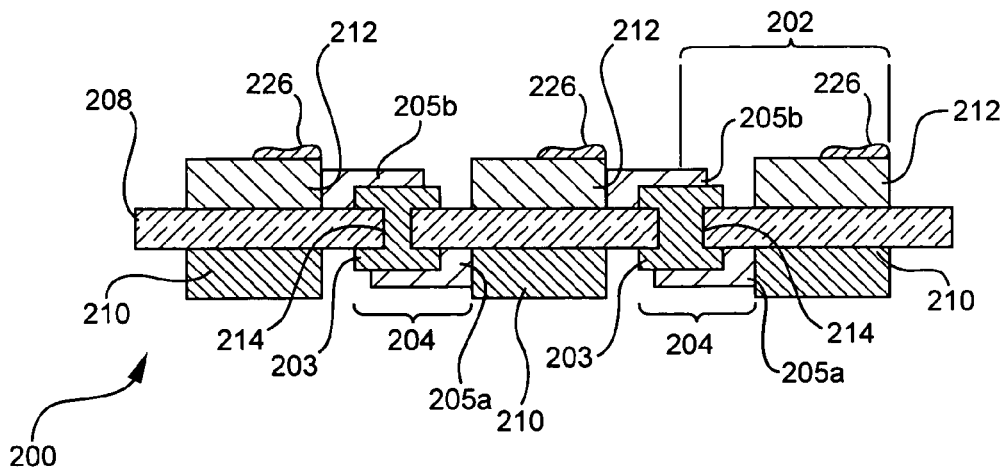
Figure 3:
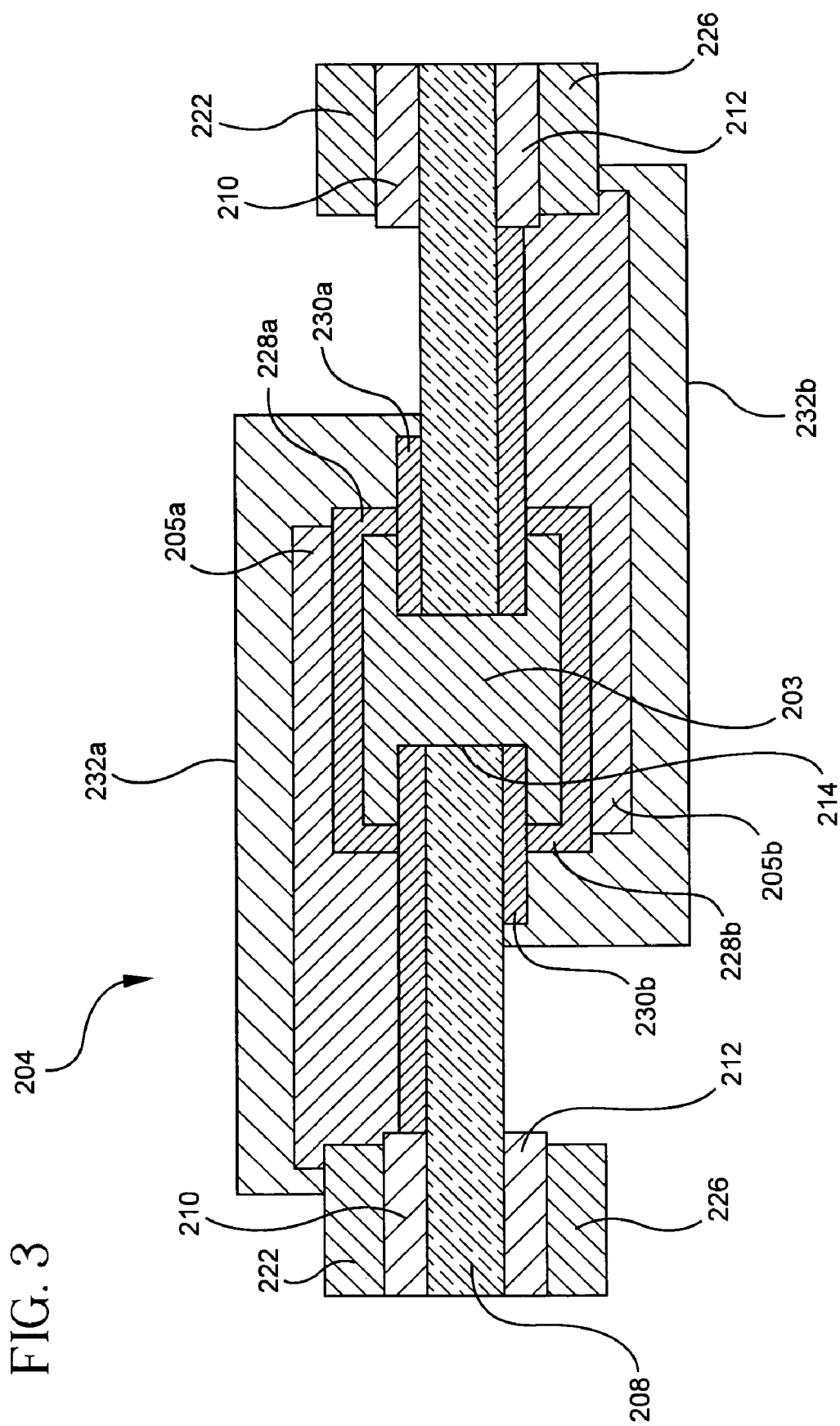
FIG. 3 is a cross-sectional side view detailing some additional component layers that may be incorporated within the fuel cell shown in FIGS. 2A and 2B.

Referring to FIGS. 2-3, there are shown different views of a fuel cell 200 that has a series of electrochemical cells 202 which are connected to one another by electrical conductors 204. As can be seen in FIGS. 2A and 2B, the fuel cell 200 is based on the electrode/electrolyte structure that includes the electrolyte sheet 208 that has disposed on opposing sides thereof an array of anode electrodes 210 and cathode electrodes 212. The electrodes 210 and 212 and electrolyte sheet 208 define multiple electrochemical cells 202. The electrochemical cells 202 are electrically interconnected in series, parallel, or a combination thereof by one or more electrical conductors 204 (e.g., via fillers, cell interconnects) that extend through via holes 214 in the electrolyte sheet 208 and contact the electrodes 210 and 212.

Instead of the portion distribution of the electrical conductors 104 of FIG. 1B, the electrical conductors 204 of FIG. 2B are composite conductors and include a via fill material 203 and two via pad structures 205a and 205b. The via fill material 203 is located within and hermetically seals one of the via holes 114 in the electrolyte sheet 108. And, the two via pad structures 205a and 205b are attached to opposing ends of the via fill material 203 that extends from both sides of the via hole 114. As shown, the via pad structure 205a contacts the anode electrode 210 and one end of the via fill material 203. Likewise, the via pad structure 205b contacts the cathode electrode 212 and the other end of the via fill material 203. Current is thus collected from the cathode 212 into the interconnect pad portion 205b, through the via portion 203 to another interconnect pad portion 205a, and is finally distributed throughout the anode 210.

An important aspect of this embodiment is that the via pad structures 205a and 205b are not in contact with both the oxidizing and reducing conditions associated with the electrolyte sheet 208 and the via fill material 203. As such, the two via pad structures 205a and 205b can be made from a variety of materials that are less costly and have improved properties when compared to the materials used to make the via fill material 203. It should also be appreciated that the two via pad structures 205a and 205b can be integral outcroppings of the electrodes 210 and 212 and not separate prints as shown in FIGS. 2A and 2B.

FIGS. 1 and 2 show the electrical conductor 104 and 204 or the via pad structures 205a and 205b as discrete elements. Providing discrete conductors 104 and 204 reduces stress from CTE mismatch between the conductor and the electrolyte sheet 108 and 208. In another embodiment, electrical connection between the electrical conductor 104 and 204 and the electrodes 110, 112, 210 and 212 may be made by a continuous line of material, rather than discrete pads as shown in FIGS. 1 and 2. The appropriate choice can be made based on CTE match of the via pad material and the electrolyte material as well as cost considerations and the relative conductivity of the electrode material compared to the via pad material.

Referring to FIG. 3, there is a cross-sectional side view detailing some additional optional component layers that may be incorporated within the fuel cell 200 shown in FIGS. 2A and 2B. Depending on the materials selected to make the fuel cell 200, it may be beneficial to add some additional component layers. For instance, the anode electrode 210 may include an optional electrically conductive current collector layer 222. Likewise, the cathode electrode 212 may include an electrically conductive current collector layer 226.

Mathematical analysis of conventional strip-cell geometry with continuous via contacts predicts two important results. First, a general design parameter for electrode width/via contact separation is obtained. Electrode width/via contact spacing, w, separation 10, as seen in FIG. 1, should be less than $$\alpha = \sqrt{\frac{R_{SC}}{\frac{1}{\sigma_c t_c} + \frac{1}{\sigma_a t_a}}} \quad \text{(Eq. 1)}$$

to ensure that near single cell performance is realized at the stack level where $R_{SC}$ is the innate single cell performance, $\sigma_c$ is the apparent conductivity of the entire cathode structure including any current collection structure 226, $t_c$ is thickness of the cathode structure 212, $\sigma_a$ is the apparent conductivity of the entire anode structure including any current collection structure 222, and $t_a$ is the thickness of the anode 210. Electrode widths and via-contact separations 10 less than the above design parameter are preferred for the flexible electrolyte fuel cell design of the present invention. It is to be appreciated that thicker electrolytes on anode supported devices can be utilized but thermal shock resistance can suffer as can the device's electrical performance, along with an increase in cost.

The second result is an analytical expression for ASR in terms of electrode width 10, conductivities, and thicknesses (including current collection structures 222 and 226). The expression is as follows:

$$ASR = \frac{w\alpha^3 R_{SC}\left(\left(k_c^2 + k_a^2 + \frac{wk_c k_a}{\alpha}\right)(e^{2w/\alpha} + 1) + 2k_c k_a\left(2e^{w/\alpha} - \frac{w}{\alpha}\right)\right)}{e^{2w/\alpha} - 1} \quad \text{(Eq. 2)}$$

$$\text{where } k_c = \frac{1}{\sigma_c t_c R_{SC}} \text{ and } k_a = \frac{1}{\sigma_a t_a R_{SC}}.$$

Electrode widths 10, electrode thicknesses, and apparent electrode conductivity including any current collection structures 222 or 226 on either the anode 210 or cathode 212 comprised of the same or different materials, porosity, etc., resolved in Equation 2 starting with any innate single cell resistance of 1 $\Omega cm^2$ or less to give an ASR<0.99 $\Omega cm^2$ is preferred.

Equation 2 assumes uniform physical properties and dimensions along the width of the electrode. In accordance with the teachings of the present invention, the ASR may be further reduced by profiling the electrode such as in thickness or composition. For example, a 15 μm layer of an Ag alloy is used as a current collector 226 on top the cathode 212. Ag alone offers suitably high conductivity to achieve a desired ASR, however, at high temperatures, Ag is mobile and prone to sublime. Lifetime of an Ag current collector is a concern even when alloyed with a precious metal. Cost of the precious metal in the alloy is acceptable. Silver may be eliminated by use of a combination of a higher conductivity oxide such as lanthanum strontium cobaltite (LSC) as a current collector 226, judicious placement of precious metal in the current collector 226 relative to the via contact 5, and some reduction of the electrode width 10 from the present value of 1 cm to ~5 mm. Thus, silver, gold, platinum, palladium, rhodium, iridium, lanthanum transition metal oxide perovskites such as LSC, and any other material with high electronic conductivity can be used as the current collector composition different than the electrode composition, in accordance with the present invention.

Instead of varying resistance one-dimensionally, the resistance of the current collector can also vary two-dimensionally. The ASR changes as a function of electrode width 10, w for a single cell with an innate resistance of 0.25 $\Omega cm^2$, an apparent anode conductivity of 10,000 S/cm, anode thickness of 15 mm, and a cathode with one layer 212 having a 15 μm thickness and a conductivity of 10 S/cm and a second layer 226 having a 0.1 μm thickness and a conductivity of 25,000 S/cm as the current collector. The material properties have been selected close to an actual SOFC comprised of a porous Ni/8YSZ anode, a 10 μm thick 8YSZ electrolyte, LSM/8YSZ cathode with a high conductivity current collector such as Au/Ag/Pd/Pt. The resistance increases from about 0.2 $\Omega cm^2$ for an electrode width of 0.1 cm to 4.8 $\Omega cm^2$ for an electrode width of 4.0 cm for a uniformly thick current collector/cathode structure. However, in accordance with the teachings of the present invention if the current collector thickness profile is optimized for performance under the constraint that the total quantity of high conductivity material per unit area is fixed, the resistance is reduced by approximately five percent (3.4 $\Omega cm^2$) for the widest electrode width calculated, 4 cm.

Figure 4A:
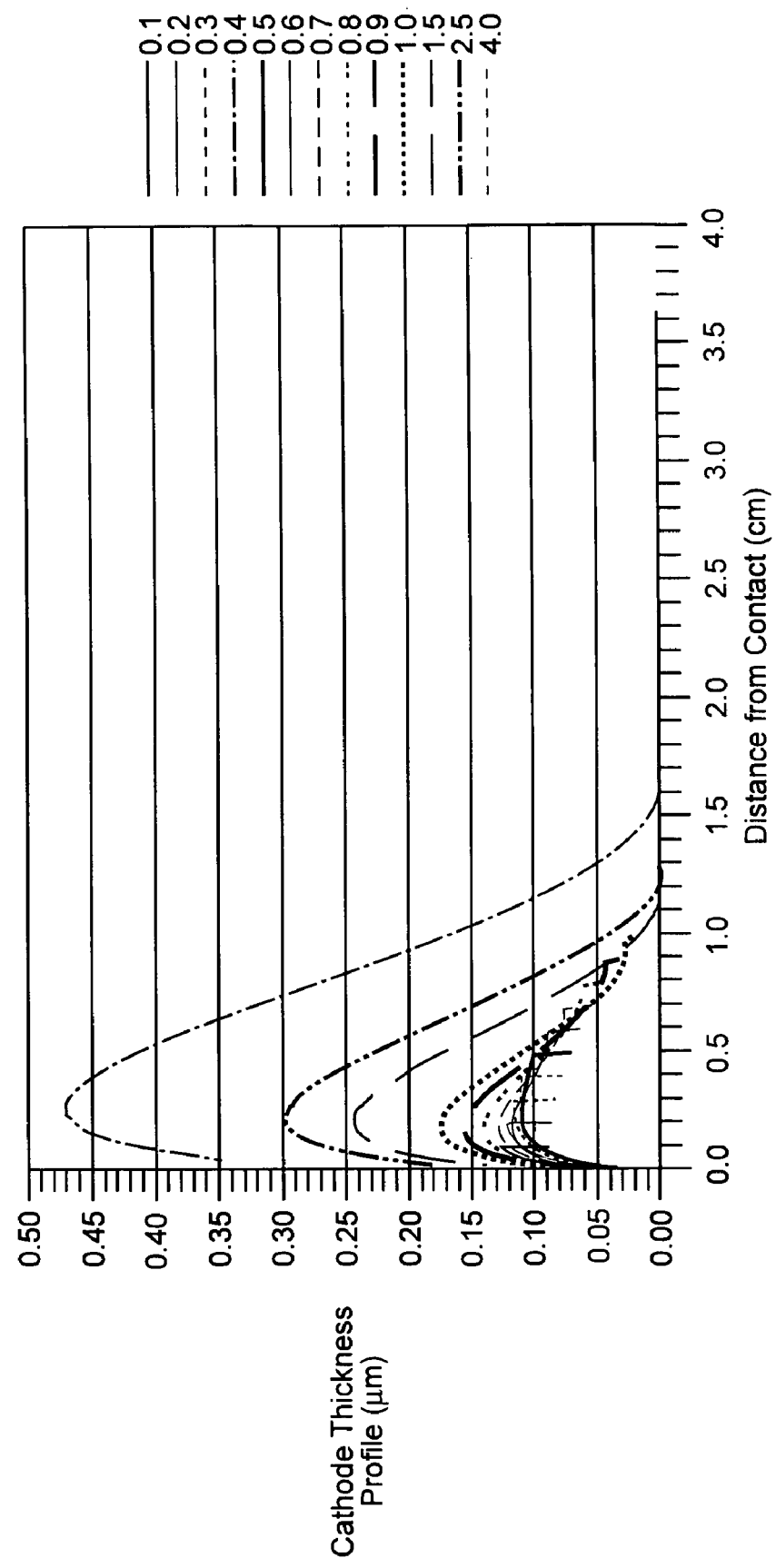
FIGS. 4A and 4B are graphs of the varying cathode thickness profile (μm) as a function of the distance from the via contact (cm) for different electrode widths (cm), in accordance with the teachings of the present invention.
Figure 4B:
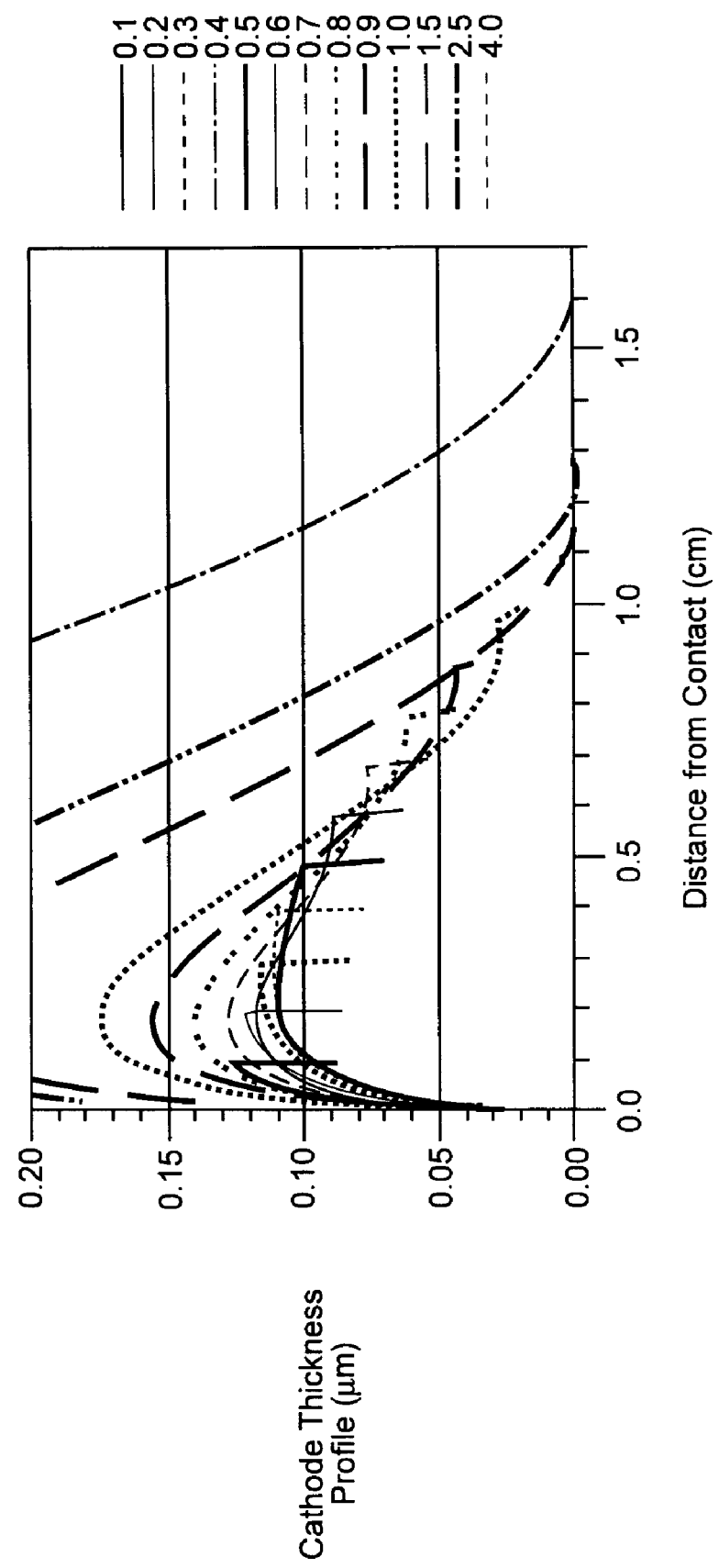

Referring to FIG. 4 for the two-dimensional case, the optimum thickness profile for various electrode widths (ranging from 0.1 to 4.0 cm) is shown, varying in height, or the y-dimension. Notice that the thickness of the current collector 226 at the cathode-via contact 5 approaches zero. The optimum profile may be difficult or expensive to fabricate. In such cases, it can be approximated by a block. Position relative to the via-contact 5 and dimensions under a material cost/volume constraint can be optimized to realize the most gain obtained by profiling. Profiling of thickness of current collection structures 222 and 226 on both the anode 210 and cathode 212 are possible. Use of an optimum thickness profile and use of an inexpensive/easily fabricated approximant, block, or other shape to the optimum profile are therefore taught in the present invention.

Figure 5:
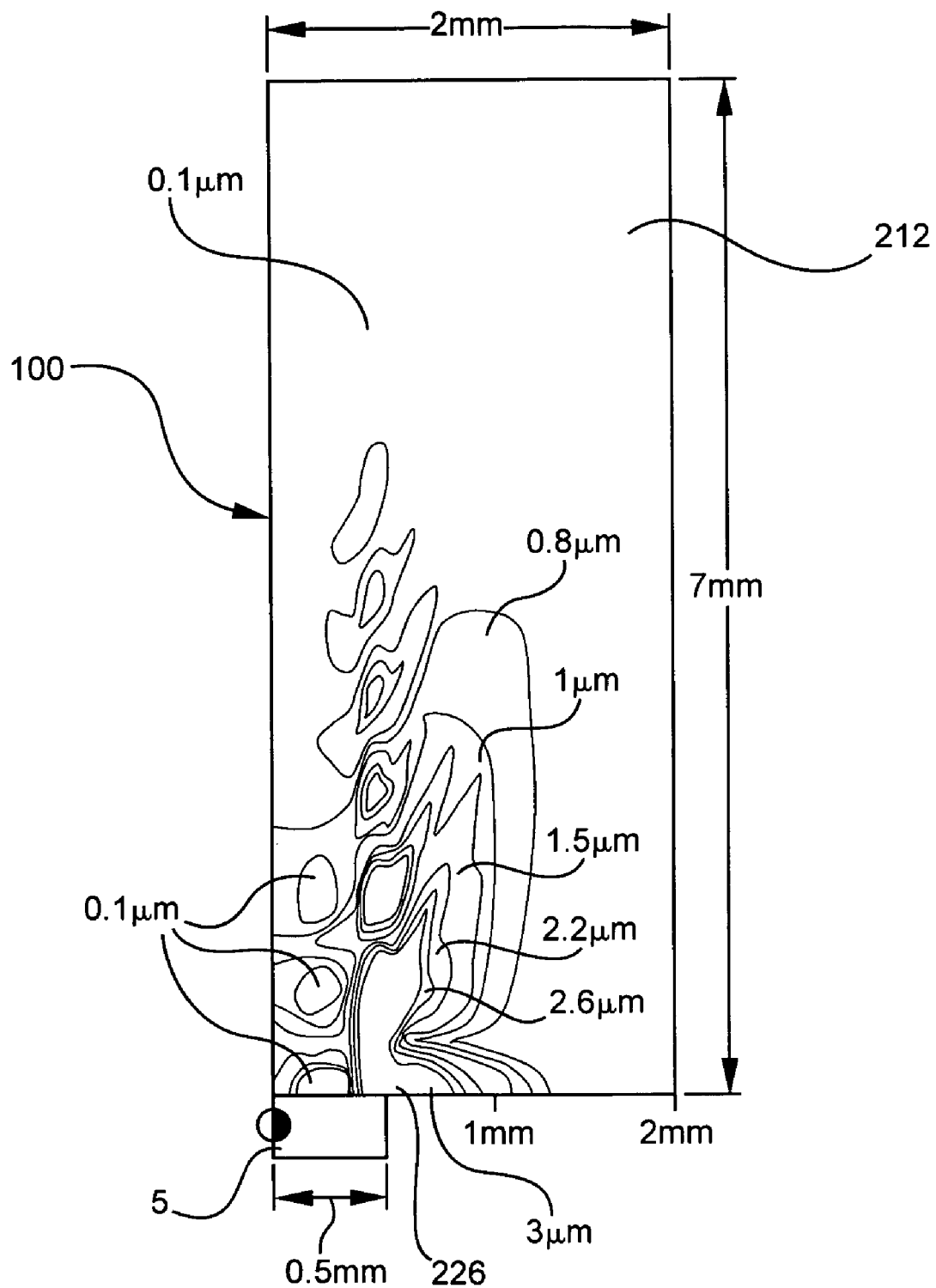
FIG. 5 is a perspective representation of a cathode structure, in accordance with the teachings of the present invention.

Referring to FIG. 5, a perspective or topological view of the protruded current collector is shown, much like low-lying land mass, a peninsular, sand dune, jutting out to the underlying cathode sea. Instead of forming a continuous strip layer of a high conductivity (1000 S/cm) oxide such as lanthanum strontium cobaltite (LSC), possibly mixed with a small quantity of precious metal (Pt, Au, Pd), the electrically conductive current collector layer 226 can be tapered or profiled to have a non-uniform distribution at a lower cost than the more costly strip-cell having the uniform thickness design of a Ag/Pt/Pd alloy current collector.

The use of discrete via contacts 5, especially for electrode separations 10 greater than the parameter "α", can increase ASR dramatically and independently of the properties of the via 114 itself. Profiling of the current collector 222 or 226 provides a technique to allow use of wider electrode structures and also to enable wider via contact spacings 12.

A non-uniformly varying resistive cathode is thus represented. Starting with the flat current collector dimensions for a typical strip-cell geometry with discrete vias 5, the electrode width of the cathode underneath the current collector is 0.7 cm, the via pad contact 5 with the electrode is 1 mm in length, and the center-to-center separation 12 of the via contacts 5 is 4 mm. Thickness of the flat current collector was initially set at 0.45 μm and a conductivity of 10,000 S/cm was chosen. A constant volume of current collector material was used in optimizing the current collector thickness profile. Identical material properties for the uniformly flat and non-uniform, optimized current collectors are as follows: $R_{sc}$=0.16 $\Omega cm^2$, $t_a$=15 μm, $\sigma_a$=15 S/cm, $t_c$=15 μm, and $\sigma_c$=10 S/cm. ASR for such a flat current collector is 0.587 $\Omega cm^2$ and is reduced by 37% to 0.367 $\Omega cm^2$ for the optimized current collector thickness profile, having portions removed to expose the cathode 212 underneath. Maximum power output is increased from 0.427 to 0.681 W/$cm^2$ when the current collector layer varied in thickness. In other words, approximately fifty percent increase in power is obtained just by profiling the current collector. For this analysis, the properties of the cathode current collector are most consistent with gold. However, use of other noble metal current collectors of other thicknesses is also possible.

Referring again to FIG. 6, a top view of the current collector overlaid on the cathode is shown. Instead of varying the resistance of the current collector layer in two dimensions, height (y-dimension) and length (x-dimension), in the perspective view of FIG. 5, the current collector can vary symmetrically about the via contact 5, in only one dimension. The thinnest lines are called filaments 601 and can be as thin as the current screen printing process allows, such as 1 to 2 μm. However, as process improvements or fabrication techniques advance, thinner lines could be reduced with reduction of material costs. When the pattern includes filaments, the filaments preferably are sized large enough that diffusion will not significantly alter the current collector structure.

The available manufacturing methods for fabricating the electrodes, current collection, and via structures for SOFC's are screen printing, tape-casting, spray-coating, brush-painting, micro-pen, ink jet type, lithography, etc. which could all be used individually or in various combinations to produce these structures. This list of fabrications techniques is not complete and other techniques that may be used to produce these structures.

Following are some other important aspects associated with the current collector layers 222 and 226:

The current collector layers 222 and 226 having via pad structures 205a and 205b can be made from a wide variety of alternative materials that have improved properties or economics, because, the via pad structures 205a and 205b are not in intimate contact with both oxidizing and reducing conditions such as the via fill material 203.

The electrical conductor 204 provides a structure that enables the use of a wide variety of materials. For example, the traditional silver alloy electrical conductor may be economically replaced by noble metal alloys which contain platinum by providing a very small amount of the expensive platinum alloy as via fill material 203 and then making the via pad structures 205a and 205b out of a less expensive alloy, such as silver-palladium.

The via pad structures 205a and 205b on the anode side 210 and cathode side 212 may comprise different geometries (e.g. bell-shaped), structures, and material selections. For instance, the via pad structures 205a and 205b by being as thin as possible may help minimize the undesirable build up of thermal mass.

Following is a list of exemplary materials that can be used to make fuel cell 200:

Via fill material 203: Noble metal alloys, cermets. For example, Au—Pt—Pd or Au—Pt—Pd with a minority of Mg or Sr doped LaCrO3.

Electrolyte sheet 208: Yttria-doped zirconia (YSZ), gadolinia-doped ceria (GDC), doped lanthanum gallate{LaGaO$_3$ (doped) MgO}, rare-earth doped zirconium, rare-earth and yttria doped bismuth oxide, doped-lanthanum aluminite{LaAlO$_3$(MgO)}, and titanate pyrochlores.

Anode via pad structure 205a: Ni/YSZ cermet, Ag alloy, Ag alloy cermet such as 90% Ag-10% with 40 volume % YSZ.

Cathode via pad structure 205b: Sr-doped LaMnO$_3$ (LSM), LSM/YSZ, Sr-doped LaCoO3 (LSC), silver alloy, silver cermet, noble metal alloys and cermets with an optional barrier layer of one coat of LSM.

Preferably, 90% silver-10% palladium with 40 volume % 3YSZ cermet current collectors 222 and 226 were printed on top of the adjacent electrodes 210 and 212. The current collectors 222 and 226 and via pad structures 205a and 205b were then co-fired at 900° C. for 1 hour. The resulting structure provides a functional solid oxide fuel cell 200 with multiple cells 202 on a chemically durable and refractory composite electrolyte/via membrane 204 and 208.

Just as the electrical conductor 104 of FIG. 1B can be broken-up as discrete parts in FIG. 2B, so can the current collector layers 222 and 226 of FIG. 3 be broken-up further as an array of two-dimensionally interconnected single cells.

Figure 7A:
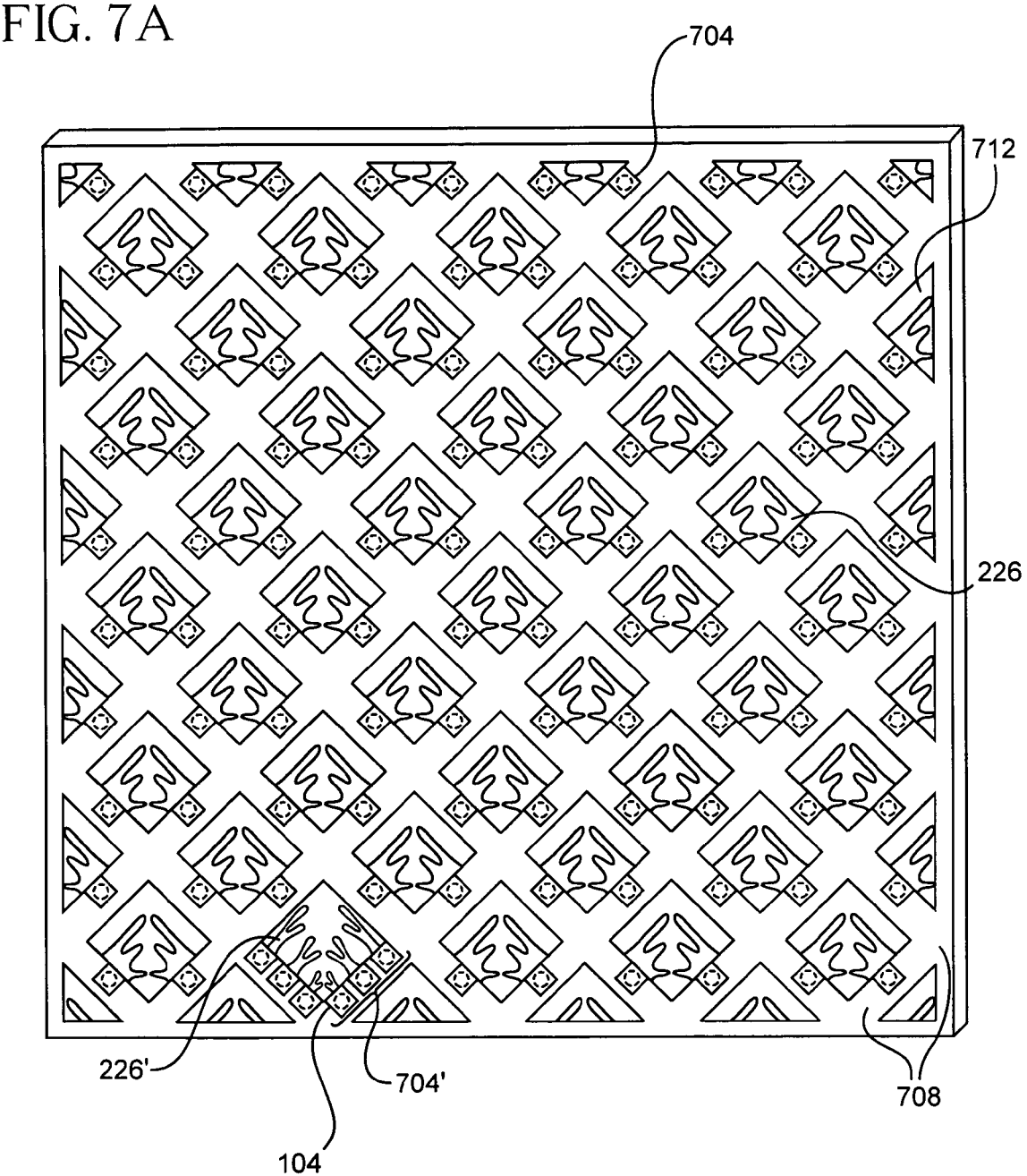
FIGS. 7A and 7B show a top view and a cross-sectional side view of a resistive-varying fuel cell that has a series of electrochemical cells which are connected to one another by resistive-varying electrically conductive members in a two-dimensional array in accordance with teachings of the present invention.
Figure 7B:
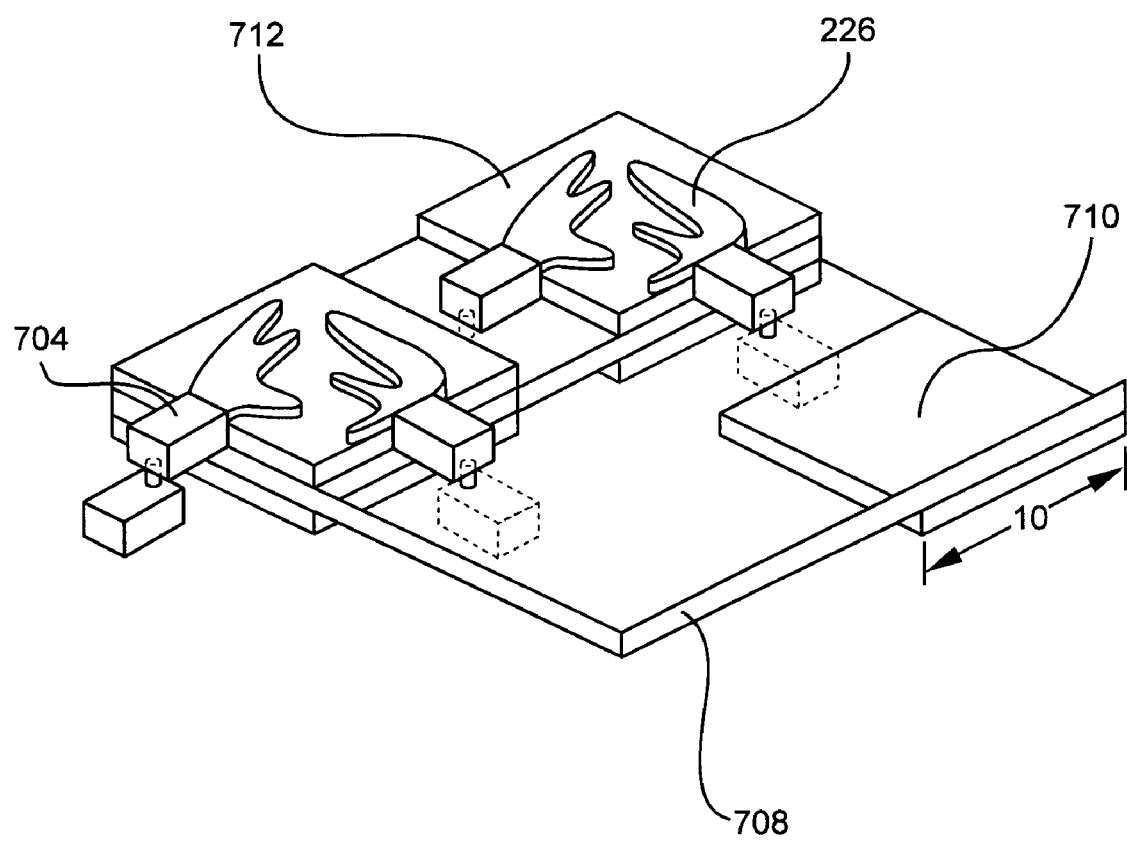

Referring to FIGS. 7A-7B, a two-dimensional array of interconnected single cells is shown having various interconnection patterns, such as a square-cell geometry with continuous via contacts. However, the present invention is not restricted to any particular families of electrode, current collector or cell interconnect materials. Thus structures such as are typically formed of wire or mesh of platinum, platinum alloy, silver, or other noble metal, nickel or nickel alloys can be used, as can coatings or patterned layers of these materials or materials such as strontium-doped lanthanum chromates or refractory metal cermets. These conductive structures may act as current collectors which are provided on top of, beneath, or along side electrode layers or they may act as interconnects between layers.

Examples of other design elements that may be included in these fuel cell packets are low resistance current collecting grids or other conductive structures provided in electrical contact with the arrayed anodes and/or cathodes. These can operate to reduce the internal resistance of the cells by reducing current distribution losses within the electrodes that would otherwise increase that resistance.

A multi-cell packet module is shown in FIG. 7A, with five sub-cells arranged in five five-cell diagonals on a wide yttria-zirconia electrolyte sheet 708. The anodes 710 of each cell are formed of nickel zirconia cermet and the cathodes 712 of lanthanum strontium manganate. Each electrode is provided with an overlying current-collecting silver-palladium alloy grid or electrical conductor 704 having a single via (or optionally, an electrical conductor 704' having multiple vias) that is connected at its collection point to a single silver-palladium-filled via that connects the cells on each module in series, as can be seen in FIG. 7B, visualized by a perpendicular intersection of the cross-sectional view of FIG. 1B.

Square-cells as shown, only as an example, or more generally two-dimensionally interconnected single cells collect and distribute current to electrodes more efficiently. For equally spaced via contacts, there are more via contacts per unit area of electrode, and the average distance from any point over an electrode to the via contact is shorter than for the strip-cells of FIG. 1A. The ASR of a square-cell design with a continuous via-contact is always lower than for the strip-cell for otherwise equal design parameters including electrode widths. Alternatively, the square-cell approach gives the same ASR as for a strip-cell but at a wider electrode spacing. For example, with the following design parameters and material properties: $R_{sc}=0.15$ $\Omega cm^2$, $t_a=t_c=10$ μm, and $\sigma_a=\sigma_c=10,000$ S/cm, for an electrode width 10 of 10 cm, the area specific resistance of the strip-cell is about 5.6 $\Omega cm^2$ while the square-cell is reduced to about 2.3 $\Omega cm^2$. Thus, electrode widths for a square-cell geometry that are a factor of two greater than are acceptable for conventional uniformed resistance strip-cells for otherwise identical design, material, and single cell properties are now allowed with the teachings of the present invention.

Alternatively, for the same electrode width, a square cell will have higher performance even with only one via contact per side. The performance increase of a square cell over a strip cell is therefore significant.

As in the strip-cell case of FIG. 4, the thickness of the current collection material such as an expensive noble metal that possesses high conductivity can be profiled to reduce ASR.

Some of the performance advantage of the square-cell geometry may be lost with discrete via contacts instead of using the continuous vias. Reduction of the via-electrode contact length increases the average distance that current must traverse during distribution or collection. For example, if the ASR was calculated as a function of an electrode width of 10 cm with one via contact per electrode side each with a contact length of 1 mm as compared to a continuous via contact for otherwise identical parameters for a single cell of Rsc=0.16 and Rsc=0.5 $\Omega cm^2$ would result in an ASR of about 5 $\Omega cm^2$ and about 85 $\Omega cm^2$, respectively, for the continuous via contact and about 6 $\Omega cm^2$ and about 100 $\Omega cm^2$, respectively, for the discrete via contact. Other properties used in the calculation are as follows: $t_a=15$ μm, $\sigma_a=15$ S/cm, $t_c=15$ μm, $\sigma_c=10$ S/cm, and a cathode current collector of 0.45 μm thickness and conductivity of 10,000 S/cm. In other words, ASR depends on via contact spacing. Once plotted, ASR can be seen to be lower for shorter electrode widths, and the transition from single-cell behavior to one governed by current collection/distribution effects occurs earlier for the single cell with the lower ASR. ASR rises rapidly for discrete via-electrode contacts at wider electrode spacings. The effect of via contact spacing on stack-level performance is notable.

For the situation of one via contact per electrode side and identical transport properties and dimensions of the cathode and anode, the midpoint of the via contact should align with the midpoint of the electrode side, as seen in FIG. 7. However, transport properties of the cathode are likely to be different than the anode and minimum ASR occurs at an off-center position, as seen in the via contact 5 of FIG. 5. Preferably, according to the teachings of the present invention, the optimum via-contact position along the electrode width should be about less than 0.4 cm for a single cell of Rsc between about 0.16 and 0.5 $\Omega cm^2$. Thus, irregular or asymmetric positioning of via contacts to reduce ASR and possible reduction of the number of vias per electrode side are also taught from the present invention.

To further compensate for the increased resistance of the discrete vias, the thickness of the current collection material such as an expensive noble metal that possesses high conductivity can be profiled to reduce ASR, as in the strip-cell case of FIG. 6. In this example of a square-cell with two discrete vias, not illustrated because of the complexity of multiple layers, infinite number of layers were used to optimize the thickness profile for a square-cell discrete via current collector. As the voltage potential varied over the cathode, anode, and across the electrolyte, computer simulation modeling of the performance of the cathode structure was done to contrast a 0.45 μm uniform distribution of a high conductivity current collector material such as gold on the cathode to the same quantity of current collector material with an optimum thickness profile with the infinite layers for varying thickness. The pertinent dimensions and transport properties were as follows: single cell ASR=0.16 $\Omega cm^2$, electrode width=5 mm, anode thickness=15 μm, anode conductivity=10,000 S/cm, cathode thickness=15 μm, cathode conductivity=10 S/cm, and cathode current collector conductivity=10,000 S/cm. Profiling of the current collector was seen to efficiently reduce ASR for otherwise identical properties and dramatically increase power density under certain conditions. The ASR of such a flat structure that takes into account current distribution and collection was 0.311 $\Omega cm^2$ and corresponds to a maximum power of ~0.8 W/cm$^2$. ASR of the profiled structure was 24% less, 0.235 $\Omega cm^2$, and increased maximum power by 33% to 1.06 W/cm$^2$. Such multiple layers can be simulated by smaller number of layers for easier manufacturing of the lesser number of layers to provide the thickness build-up.

Figure 8:
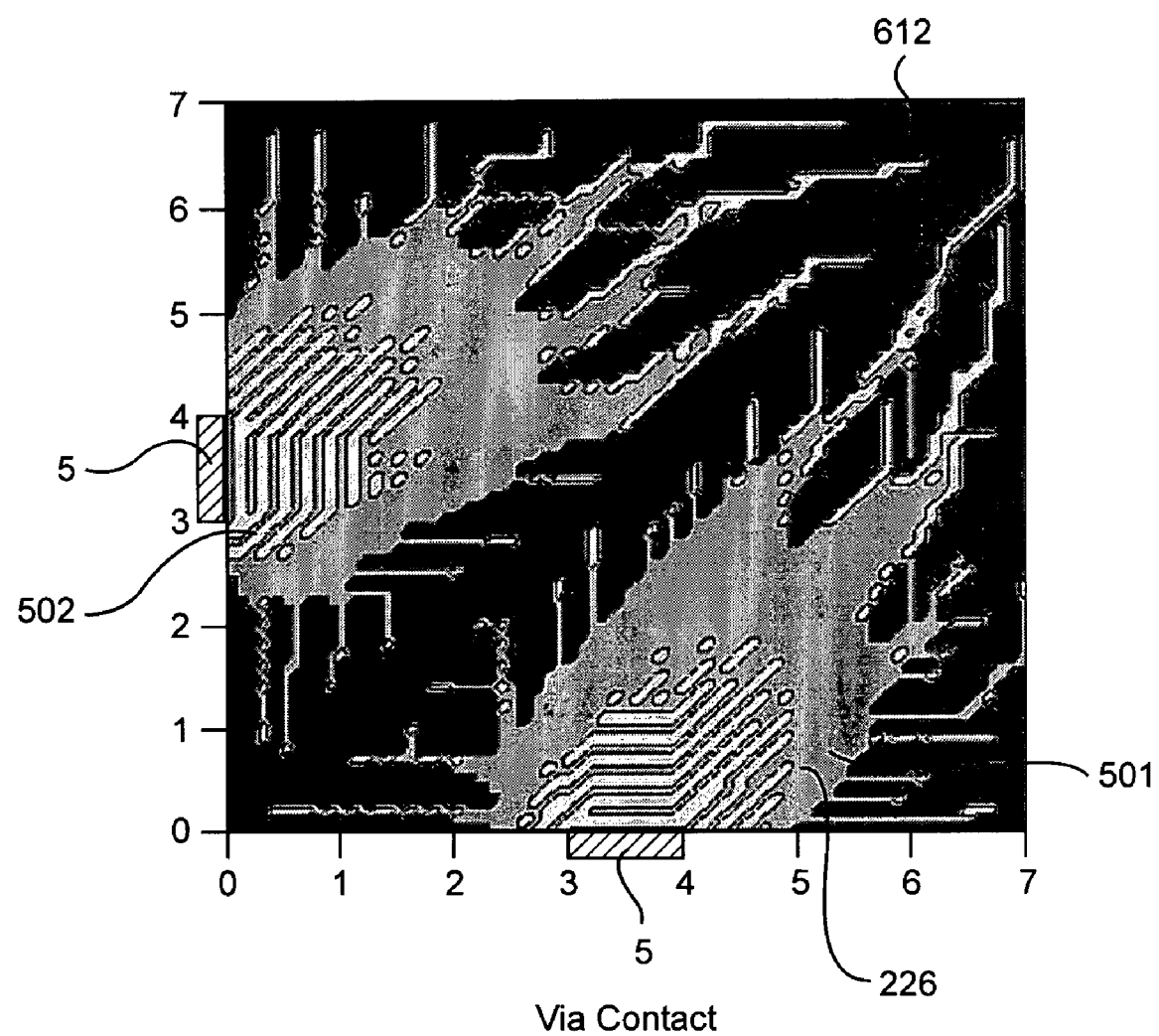
FIG. 8 shows a top view of a fuel cell that has a series of electrochemical cells which are connected to one another by resistive-varying current collectors that have enhanced geometries and compositions in accordance with the teachings of the present invention.

Referring to FIG. 8, a two layer optimization of the thickness profile of a 7 mm×7 mm square-cell with discrete vias for the current collector is shown disposed over a cathode to form a cathode structure that could be used in a 71×71 current collection grid. The first optimizations for the shape of the current collector under the constraint of a constant volume gave continuously varying thickness as seen in FIG. 5. Although the current collector with a continuously varying thickness can offer the lowest possible resistance, it is quite difficult to make with multiple layers. Techniques for applying coatings generally produce a uniform thickness. The optimization was adjusted to account for this in that it can be optimized for an arbitrary number of layers each with a fixed thickness that combined approximate the shape of the continuously varying profile. In FIG. 8, both layers 501 and 502 are current collector material each with the same thickness. The second current collection layer 502 is disposed on the first current collection layer 501 in all cases so the total current collector thickness at those locations is the sum of the thickness of the first layer (501) and second layer (502) that was applied. It turns out that most of the benefit of a shaped current collector is obtained for just one layer. The single layer has protrusions, in the shape of fracture fingers, finger coral fossils, flames or other protruded shapes radiating from the via contact 5.

A uniform distribution of a high conductivity current collector material such as gold on the cathode to the same quantity of current collector material was contrasted with an optimum thickness profile with the infinite layers for varying thickness with the same properties: $R_{sc}$=0.6 $\Omega cm^2$, $t_a$=10 μm, $\sigma_a$=10,000 S/cm, $t_c$=20 μm, $\sigma_c$=20 S/cm, $t_{cc}$=0.4 μm, $\sigma_{cc}$=30,000 S/cm. The ASR of such a flat structure was 0.761 $\Omega cm^2$. Optimized thickness for each layer was 0.63 μm with the result being that only 50% of the electrode surface is covered with current collector material. Profiling of the current collector was seen to efficiently reduce ASR for otherwise identical properties. ASR of the profiled structure was decreased by 8% to 0.700 $\Omega cm^2$.

Figure 9:
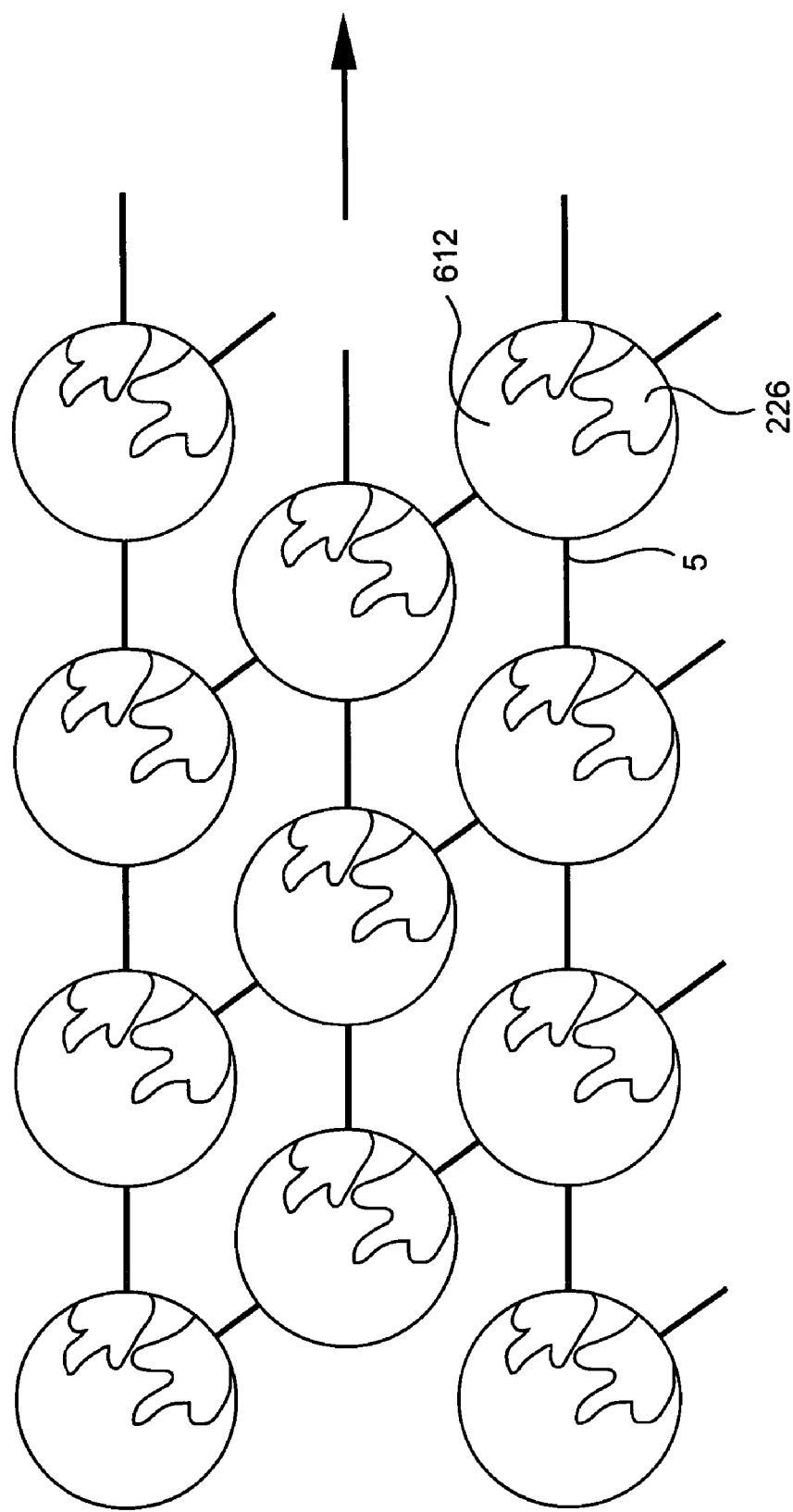
FIG. 9 shows a top view of a fuel cell that has a series of electrochemical cells which are connected to one another by resistive-varying electrically conductive members that have enhanced geometries and compositions in an orthogonal via array in accordance with the teachings of the present invention.

Referring to FIG. 9, an arcuate cell pattern of the grid array is shown instead of the square cell pattern of FIG. 7A. Viewed in a different way, the circular, oval, or elliptical cells are infinite linear lines replacement of hexagons from the hex-cell geometry with circles or ovals. The hexagonal cell is a diamond cell in which the angle between the electrode sides is 60° and some electrode material is removed in order to form a hexagon. A diamond cell results from modification to square-cells in which the angle between electrode sides is not equal to 90°. When the angle between electrode sides is equal to 90°, a rectangular cell results from modification to a square-cell where the electrode side lengths are no longer equal.

The modeling work, techniques for optimization of current collection structures, and teachings of the present invention are equally relevant for all such cell patterns and other two-dimensional arrays in combination with both discrete and continuous via contacts.

The electrical conductors 104 form a plurality of current collection or distribution mesh that emanates from the primary current collection/distribution structure for connecting each of the sub-current collectors to the exposed portions of the substrate, in this case, the electrolyte, for maximizing current collection.

Within each fuel packet, Ni metal, in the form of wire, ribbon, felt, or mesh, may be employed to connect two or more multi-cell-sheet devices in series. It is also advantageous to employ more than one point of power take-off from each sheet device, in order to reduce the current through each take off and the distance that must be traversed from the cells to the lead connection. At lower currents, the cross-section of the take off and of the leads may be reduced so as to limit material costs and thermal stress. Positioning power take-offs along the edges of the packets rather than at the packet ends also helps to avoid gas flow disruptions at the inlet and exhaust openings of the chambers, although depending on the geometry of the electrodes, this orientation can place the long axis of the cell electrodes parallel to the flow of fuel. Following packet sealing, silver mesh electrode leads are attached at multiple points to the leading cathode (adjacent the gas supply tube), and to the vias connected to the trailing anode.

The teachings of the present invention have already described optimization of the thickness profile of current collectors to reduce cost of materials such as precious metals and maximize performance. Although the aforementioned embodiments of the present invention concerns improved via interconnects in an SOFC design having an array of electrodes on one electrolyte sheet, it should be understood that the same via fill alloys and similar structures of the present invention may be beneficially applied to other SOFC designs. For example, a planar fuel cell having a bipolar interconnect plate can use any one of the embodiments of the aforementioned electrical conductors. In particular, the planar fuel cell can have an interconnection that is facilitated by providing via holes in a separator plate, and the via holes are filled with a conductive metal or cermet like the robust Pt alloy via fill materials and contact geometries disclosed herein. An example of such a planar fuel cell plate that can be enhanced by using the electrical conductors of the present invention has been described in PCT WO 03/007403 which is hereby incorporated by reference herein.

Electrically speaking, anything done on an electrode, current collector or cell interconnect material that connects with the electrolyte sheet can be equivalently done to any of these subparts. For example, if the electrolyte sheet is caused to have a non-uniform or porous surface (in diamond or cellular indented grids) for increasing active surface or reducing current lengths or the vias is changed then the electrode thickness should also be reduced to minimize the resistance path to maximize current density. Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. An electrode structure in a fuel cell device, the electrode structure comprising:
a charge transfer member; and
an electrically conductive member disposed on the charge transfer member, the electrically conductive member comprising a current collector disposed on top of the charge transfer member, wherein the current collector is structured in the form of a cut-away pattern having a plurality of protrusions that extend in multiple directions and are configured to expose the top of the charge transfer member so as to optimize current coupling.

2. The electrode structure of claim 1, wherein the electrically conductive member further comprises a via contact for interconnecting the current collector of a first cell to a second cell.

3. The electrode structure of claim 2, wherein the current collector has a non-uniform thickness.

4. The electrode structure of claim 1, wherein the current collector has a non-uniform thickness.

5. The electrode structure of claim 4, wherein the charge transfer member comprises strontium-doped lanthanum manganite.

6. The electrode structure of claim 3, wherein the charge transfer member comprises strontium-doped lanthanum manganite.

7. The electrode structure of claim 2, wherein the charge transfer member comprises strontium-doped lanthanum manganite.

8. The electrode structure of claim 1, wherein the charge transfer member comprises strontium-doped lanthanum manganite.

9. The electrode structure of claim 4, wherein the current collector has a composition selected from the group consisting of platinum, silver, palladium, gold, rhodium, nickel, copper, and iridium.

10. The electrode structure of claim 1, wherein the current collector has a composition selected from the group consisting of platinum, silver, palladium, gold, rhodium, nickel, copper, and iridium.

11. The electrode structure of claim 1, wherein the protrusions have a shape when viewed from a direction substantially perpendicular to the top of the charge transfer member of fracture fingers, finger coral fossils, or flames.

12. The electrode structure of claim 1, wherein a plurality of the projections include a primary leg that extends in a respective primary direction, and one or more secondary legs that extend from a respective primary leg in one or more secondary directions.

13. The electrode structure of claim 1, wherein a plurality of the projections include a primary leg comprising a first segment having a first width and a second segment having a second width.

14. The electrode structure of claim 1, wherein a plurality of the projections include a primary leg having a length and a width, where the width varies continuously along the length.

\* \* \* \* \*